United States Patent
Grob-Lipski et al.

(10) Patent No.: US 8,289,927 B2
(45) Date of Patent: Oct. 16, 2012

(54) DATA FORWARDING METHOD AND APPARATUS THEREOF

(75) Inventors: Heidrun Grob-Lipski, Starzach (DE); Stephen Kaminski, Eislingen (DE); Hajo-Erich Bakker, Eberdingen (DE)

(73) Assignee: Alcatel Lucent, Paris (FR)

( * ) Notice: Subject to any disclaimer, the term of this patent is extended or adjusted under 35 U.S.C. 154(b) by 336 days.

(21) Appl. No.: 12/650,085

(22) Filed: Dec. 30, 2009

(65) Prior Publication Data
US 2010/0165850 A1 Jul. 1, 2010

(30) Foreign Application Priority Data
Dec. 31, 2008 (EP) ..................... 08291262

(51) Int. Cl.
*H04W 4/00* (2009.01)
(52) U.S. Cl. ..................................... 370/331
(58) Field of Classification Search .......... 370/328–339; 455/436–444
See application file for complete search history.

(56) References Cited

U.S. PATENT DOCUMENTS

| | | | | |
|---|---|---|---|---|
| 8,054,806 B2* | 11/2011 | Aydin et al. | .................. | 370/331 |
| 2004/0081119 A1 | 4/2004 | Zhong et al. | | |
| 2008/0102841 A1* | 5/2008 | Kato | .............................. | 455/442 |
| 2009/0034476 A1* | 2/2009 | Wang et al. | .................... | 370/331 |
| 2009/0191874 A1* | 7/2009 | Du et al. | ......................... | 455/436 |
| 2010/0035616 A1* | 2/2010 | Sebire | ........................... | 455/436 |
| 2010/0238799 A1* | 9/2010 | Sebire | ........................... | 370/225 |

FOREIGN PATENT DOCUMENTS

| | | |
|---|---|---|
| EP | 1 919 241 A2 | 5/2008 |
| EP | 1 995 981 A1 | 11/2008 |

OTHER PUBLICATIONS

Nortel: "Handover Failure and Data Forwarding Stop," 3GPP TSG-RAN WG3 Meeting #57, Athens, Greece, R3-0714000, XP050162233, pp. 1-4, Aug. 2007.
European Search Report.

* cited by examiner

*Primary Examiner* — Frank Duong
(74) *Attorney, Agent, or Firm* — Fay Sharpe LLP

(57) ABSTRACT

A method of data forwarding during handover in a mobile communication system is provided. The mobile communication system comprising a plurality of base stations and a base station, the base station being coupled to a gateway, a telecommunication link being established between a user equipment and the base station. The method comprising: selecting a set of base station from the plurality of base stations as candidate base stations for a handover of the user equipment by the base station; selecting a first target base station for handover from the set of base stations by the base station; obtaining downlink data from a gateway and up-link data from a user equipment by the base station; forwarding the uplink and downlink data from the base station to the first target base station.

20 Claims, 8 Drawing Sheets

DATA FORWARDING METHOD AND APPARATUS THEREOF

BACKGROUND OF THE INVENTION

The invention is based on a priority application EP 08291262.7 which is hereby incorporated by reference.

The present invention relates to a method of data forwarding during handover in a mobile communication system, to a base station, to a mobile communication system and to a computer program product.

In a cellular network, a cell typically has several neighboring cells. The handover procedure allows the continuation of a call when a user equipment crosses the border of one cell to another. The basic concept of handover is that when a user terminal moves from the coverage area of one cell to another, a new connection to the target cell is set up and the connection to the old cell may be released. During the handover, data interruption may occur caused by delays in signaling message, or caused by problems during the signaling with the candidate base station and the source base station.

In general, when a user equipment moves from one cell to another in a cellular radio system and the handover is performed, the handover may be described as a hard handover or a soft handover. During the hard handover, the old connection is broken before a new one is set up. Therefore, handover margins are used in order to diminish the problem of data interruption. However, the base station connection cannot be utilized in such a case due to the handover margin and the delay of the handover procedure. During the soft handover, updating margins are also employed.

Further, a pilot signal is used to identify a base station and to form an active set in a mobile communication system. The pilot signal is continuously transmitted by each base station to beyond its service coverage area. The user equipment can identify the base stations on the basis of the pilot signal, since the signals differ from one another. The user equipments continuously measure pilot signals and maintain a measurement list of the base stations and the corresponding signal quality levels of the pilot signals that are situated near the user equipment and that are possible candidates for handover or connection establishment.

The base stations on the measurement list form a group of candidates that may become a serving base station. User equipments may monitor the pilot signals of only those base stations that are on the measurement list. When a user equipment moves, the measurement list is updated as the need arises. The updating process is performed according to the measurements of the user equipment based on the strength of the pilot signal, that is if a pilot signal transmitted by a base station is received with adequate strength, it is added to the measurement list.

SUMMARY OF THE INVENTION

The invention relates to a method of data forwarding during handover in a mobile communication system, the mobile communication system comprising a plurality of base stations and a base station, the base station being coupled to a gateway, a telecommunication link being established between a user equipment and the base station, the method comprising: selecting a set of base station from the plurality of base stations as candidate base stations for a handover of the user equipment by the base station; selecting a first target base station for handover from the set of base stations by the base station.

The method further comprises obtaining downlink data from a gateway and uplink data from a user equipment by the base station; forwarding the uplink and downlink data from the base station to the first target base station; detecting a handover or radio link failure by the user equipment; transmitting a connection establishment message to a second target base station of the set of base stations by the user equipment; accepting access request of the user equipment by the second target base station; transmitting a message by the second target base station to the base station, the message being indicative of access of the user equipment to the second target base station; forwarding the uplink and downlink data to the second target base station. One of the advantages of the invention is that it allows data forwarding to a new target base station, in case of a handover failure or radio link failure.

The term 'base station' as used herein refers to any type of fixed network element capable of exchanging data with a user equipment. The term "user equipment" as used herein refers to any type of fixed or mobile (or portable) communication terminal capable of exchanging data with a radio-communication network on a radio communication link. Consequently, it may be, among other things, a telephone or desktop computer connected to a local router or server and equipped with a radio communication interface; a mobile telephone; a laptop computer or personal digital assistant (or PDA) equipped with a radio communication interface; a server or local router equipped with a radio communication interface; a high-frequency radio receiver, or a terrestrial or satellite television receiver.

In accordance with an embodiment, the method further comprises:
  storing the data in storage means by the base station;
  aborting data forwarding to the first target base station by the base station.

The forwarding to the second target base station step further comprises:
  forwarding the stored data to the second target base station by the base station.

In accordance with an embodiment, the method further comprises:
  aborting data forwarding to the first target base station by the base station;
  requesting the data from the first target base station by the base station;
  obtaining the data from the first target base station by the base station.

The forwarding to the second target base station step further comprises:
  forwarding the data to the second target base station by the base station.

In accordance with an embodiment, the method further comprises:
  obtaining by the base station an end marker message indicating that all data has been transmitted from the first target base station;
  reordering the data obtained from the first target base station and from the gate-way by the base station before forwarding to the second target base station.

In accordance with an embodiment, the method further comprises:
  transmitting a forwarding-request to the first target base station for forwarding of the data to the second target base station by the base station. The forwarding to the second target base station step further comprises:
  forwarding the data to the second target base station by the first target base station.

forwarding the data to the first target base station by the base station.

In accordance with an embodiment, the method further comprises:
aborting data forwarding to the first target base station by the base station;
transmitting a forwarding-request to the first target base station for forwarding of the data to the second target base station by the base station.

The forwarding to the second target base station step further comprises:
forwarding the data to the second target base station by the first target base station.
forwarding the data to the first target base station by the base station;

In accordance with an embodiment, the method further comprises:
requesting the data from the first target base station by the second target base station;
receiving the data from the first target base station by the second target base station.

In accordance with an embodiment, the method further comprises:
aborting data forwarding to the first target base station by the base station;
requesting the data from the first target base station by the second target base station;
requesting the data from the base station by the second target base station;
receiving the data from the first target base station and from the base station by the second target base station.

In accordance with an embodiment, the method further comprises:
obtaining an end marker message indicating that all data has been transmitted from the first target base station by the second base station;
reordering the data received from the base station and from the first target base station by the second target base station.

In accordance with an embodiment, a first target base station identification is transmitted by the base station or by the user equipment to the second target base station.

In another aspect, the invention relates to a base station for a mobile communication system, the base station comprising:
means for selecting the set of base station as candidate base stations for a hand-over of the user equipment by the base station;
means for selecting a first target base station for handover from the set of base stations by the base station;
means for obtaining downlink data from a gateway and uplink data from a user equipment by the base station;
means for forwarding the uplink and downlink data from the base station to the first target base station.
means for receiving a message from the second target base station by the base station, the message being indicative of access of the user equipment to a second target base station;
means for storing the uplink and downlink data in storage means by the base station;
means for aborting data forwarding to the first target base station by the base station;
means for forwarding the stored data to the second target base station by the base station.

In another aspect, the invention relates to a base station for a mobile communication system, the base station comprising:
means for accepting access request of the user equipment by the second target base station;
means for transmitting a message by the second target base station to the base station, the message being indicative of access of the user equipment to the second target base station;
means for requesting data from the first target base station by the second target base station;
means for receiving the data from the first target base station by the second target base station.

In an embodiment, the base station further comprises:
means for receiving the data from the base station by the second target base station;
means for obtaining an end marker message indicating that all data has been transmitted from the first target base station by the second base station;
means for reordering the data received from the base station and from the first target base station by the second target base station.

In another aspect, the invention relates to a mobile communication system operable to perform a method in accordance with any of the preceding embodiments.

In another aspect, the invention relates to a computer program product stored on a storage medium, comprising executable program means for causing a base station to perform a method according to any of the preceding embodiments when the program is run on the base station.

BRIEF DESCRIPTION OF THE DRAWINGS

In the following, preferred embodiments of the invention will be described in greater detail by way of example only making reference to the drawings in which.

DESCRIPTION OF THE DRAWINGS

Figure 1:
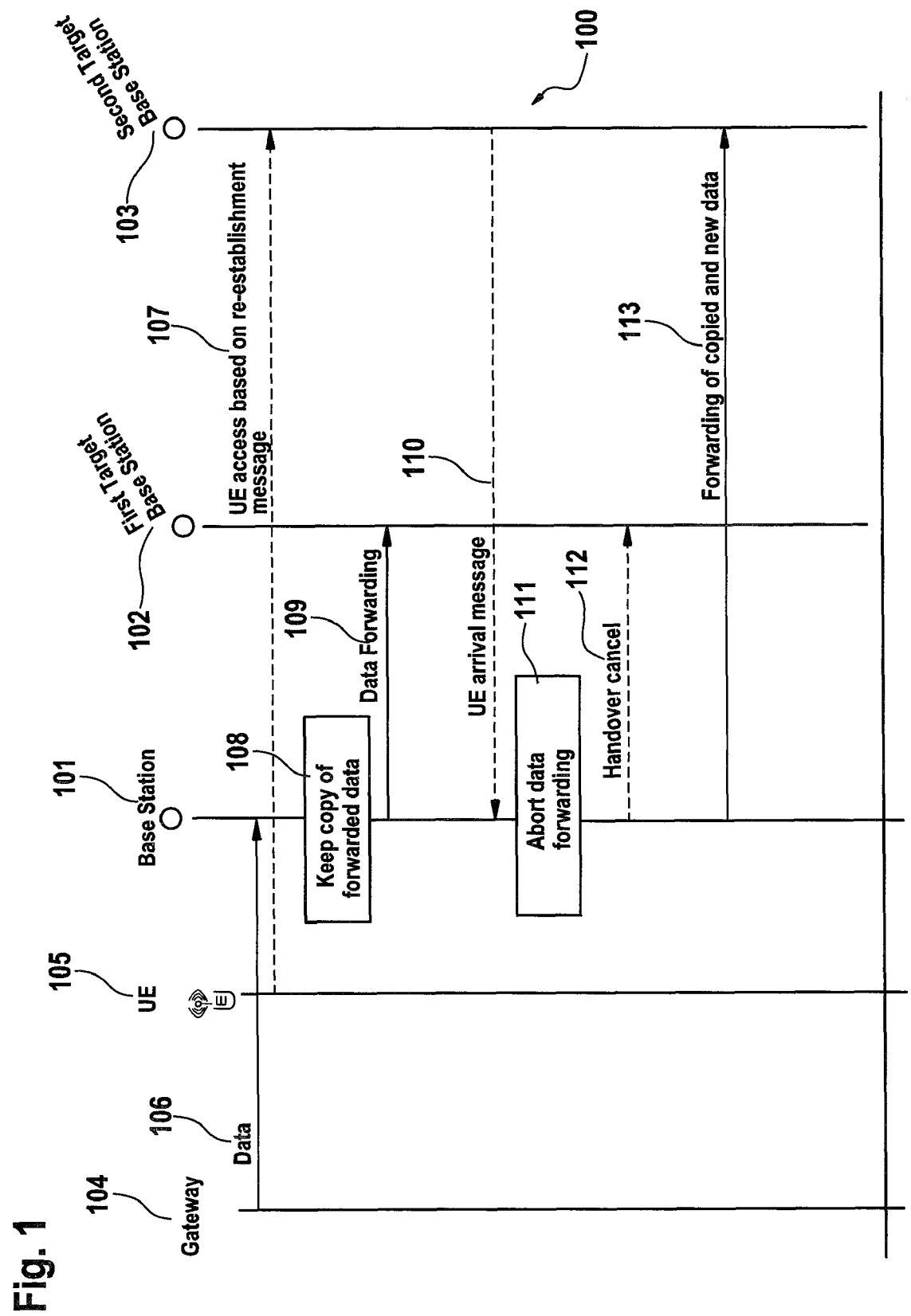
FIG. 1 is a diagram of an embodiment of the signaling between the user equipment and the plurality of base stations.

FIG. 1 shows a diagram 100 of an embodiment of the data forwarding method in a mobile communication system. The mobile communication system comprises a base station 101, a first target base station 102, a second target base station 103, and a gateway 104. Initially, a telecommunication link is established between the base station 101 and a user equipment 105.

The user equipment 105 continuously transmits measurement reports to the base station describing the signal quality of the neighboring base stations, which may be used as candidate base stations for a handover of the user equipment 105. One of the transmitted measurement reports triggers a single or multiple handover preparation, so that the base station sends at least one handover request to at least one of the neighboring base stations, using for example the measurement report transmitted by the user equipment 105. The base station 101 receives a handover request acknowledgement of at least one of the base stations. The base station 101 selects one or a set of base stations from a plurality of base stations as candidate base stations for the handover of the user equipment. The selected set of base stations corresponds to the base stations that transmitted a handover request acknowledgement to the base station. Then, a first target base station 102 is selected for handover from the set of base stations by the base station 101.

During the normal communication between the base station 101 and the user equipment 105, downlink data 106 from a gateway and uplink data from the user equipment 105 is continuously obtained by the base station 101. Once the first target base station has been selected by the base station 101, the base station 101 delivers the handover command to the user equipment 105 and initiates the forwarding of the uplink and downlink data from the base station 101 to the first target base station 102. In the meantime, and in no particular order, if due to radio link failure or handover failure, the user equipment 105 is not able to access the first target base station 102, the user equipment 105 may require to synchronize and transmit a connection re-establishment message 107 to a second target base station of the set of base stations that have been prepared by the base station 101.

In an embodiment, the base station 101 may keep a copy 108 of the data 106, before forwarding 109 the data to the first target base station 102. Then, the second target base station 103 accepts the access request of the user equipment 105 and transmits a message 110 to the base station 101. The message 110 indicates the access of the user equipment 105 to the second target base station 103. Further, the base station 101 aborts the data forwarding 111 to the first target base station 102. Then, the base station 101 transmits a handover cancel message 112 to the first target base station 102 and starts forwarding 113 copied and new data to the second target base station 103.

Figure 2:
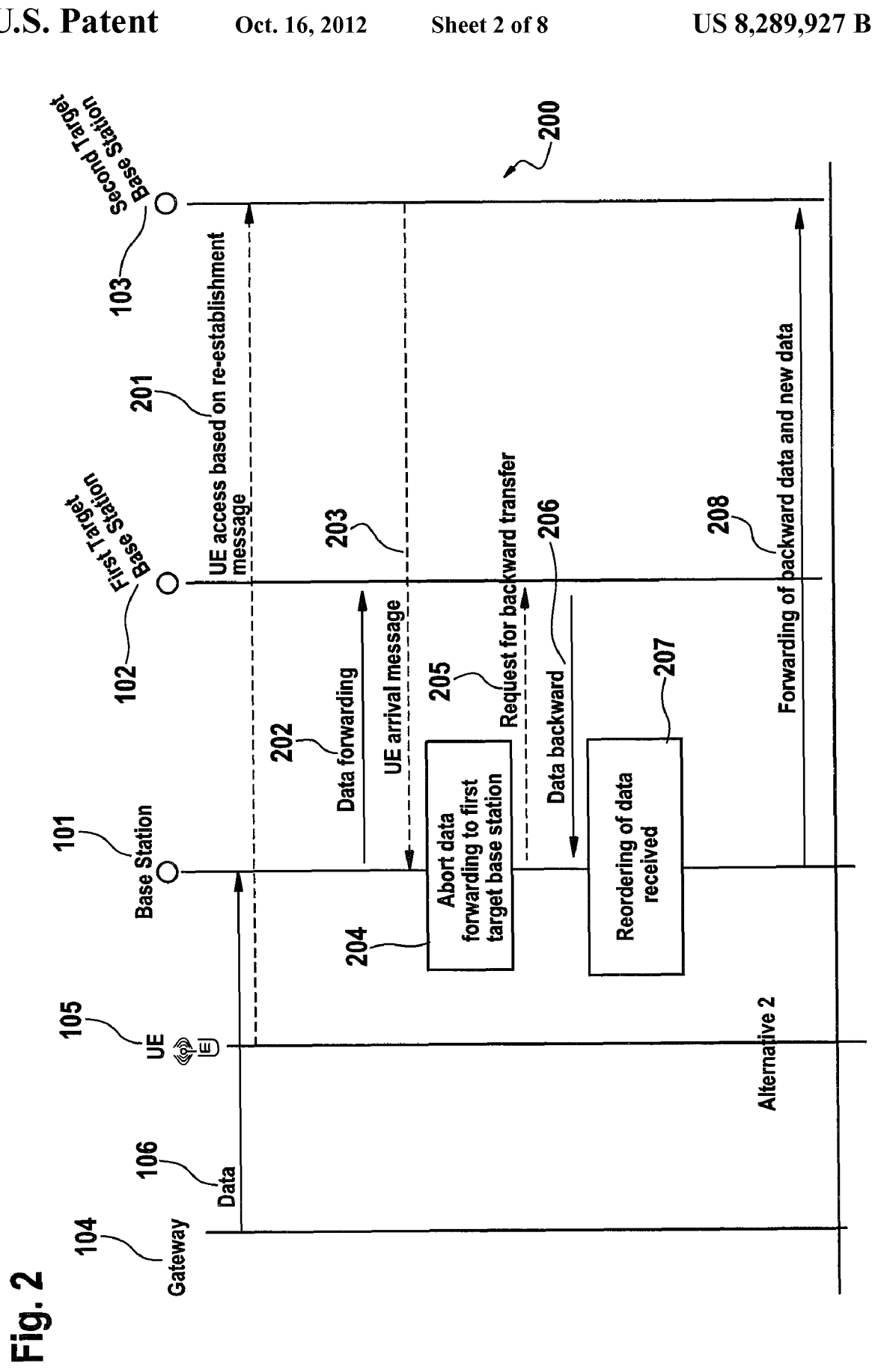
FIG. 2 shows a diagram of a further embodiment of the signaling between the user equipment and the base stations.

FIG. 2 shows a diagram 200 of an embodiment of a data forwarding method in a mobile communication system.

The base station 101 continuously receives uplink data from the user equipment 105 and downlink data 106 from the gateway 104. After the user equipment 105 detects a radio link failure or handover failure, and is not allowed to access the first target base station 102, the user equipment 105 transmits a connection establishment message to the second target base station 103, which has been previously prepared by the base station 101 for handover. In the meantime, the base station 101 has started the data forwarding 202 of the uplink and downlink data to the first target base station 102.

The data forwarding 202 continues until a message arrives to the base station 101 from the second target base station 103, the message 203 identifying the access of the user equipment 105 to the second target base station 103. The base station 101, after reception of the message, aborts 204 the data forwarding to the first target base station 202. Further, base station 101 requests 205 the forwarded data back from the first target base station 102 to the base station 101. The requested data is obtained 206 by the base station 101. As new downlink data may have arrived to the base station 101, together with the data received by the first target base station 102, a reordering procedure 207 is started. The reordering procedure 207 reorders the data received from the gateway, data received from the first target base station and data not yet forwarded to any of the target base stations.

Finally, the base station 101 starts forwarding 208 the backward data and the new data to the second target base station 103. One of the advantages of this embodiment, is that the base station does not require to store the already forwarded uplink and the downlink data, in case that a handover or radio link failure does not allow the user equipment to access the originally selected target base station.

Figure 3:
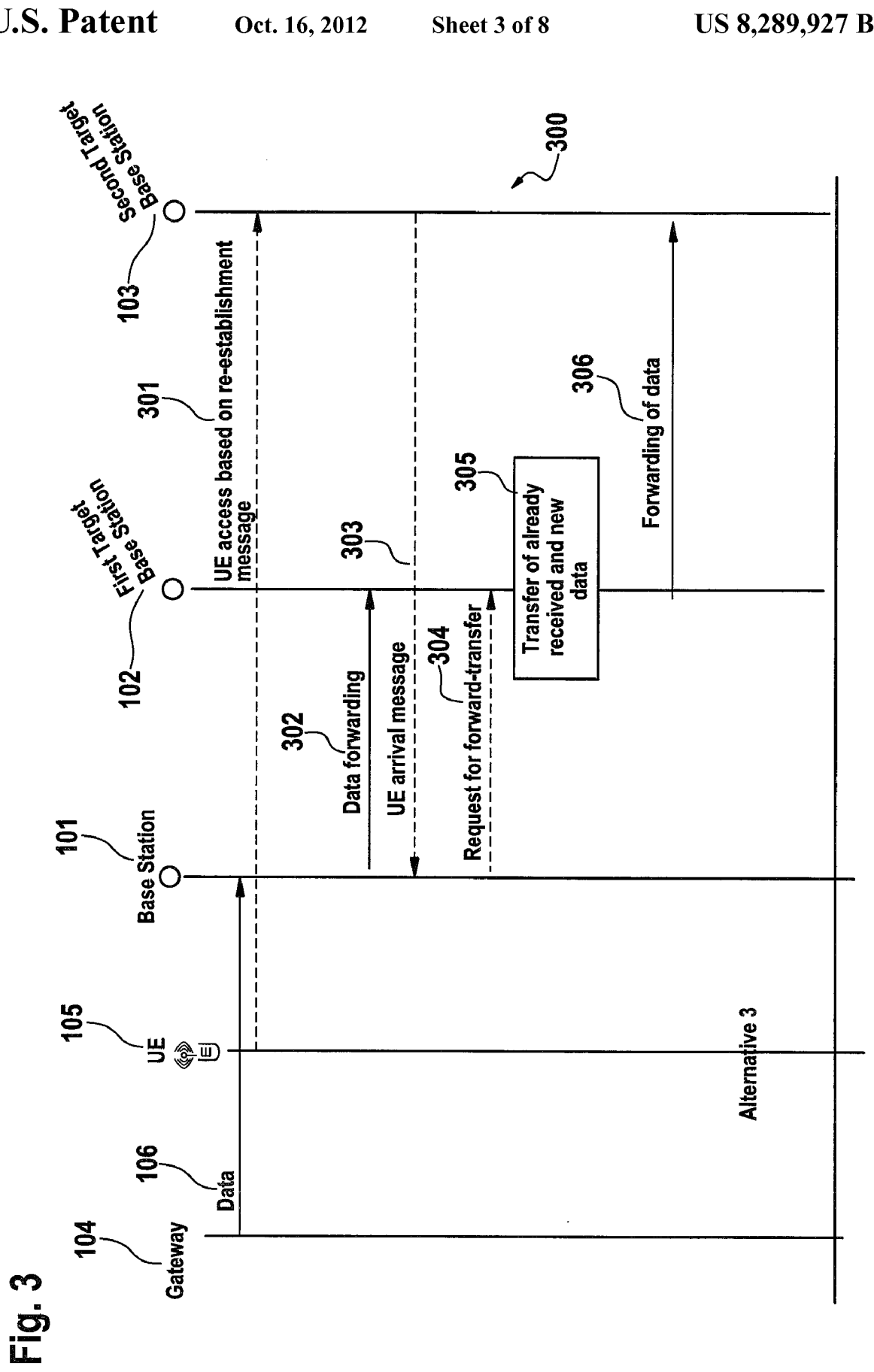
FIG. 3 is a diagram of a further embodiment of the signaling between the user equipment and the plurality of base stations.

FIG. 3 shows a diagram 300 of an embodiment of a data forwarding method in a mobile communication system. During a normal active call and also during the handover procedure, uplink data from the user equipment 105 and downlink data from gateway 104 is obtained by the base station 101. In case of a radio link or handover failure, the user equipment may have no access to the originally selected target base station 102, and may require to request access to a second target base station 103, using a re-establishment message 301.

The uplink and downlink data 106 received by the base station 101, is forwarded 302 to the originally selected target base station 102, until a message 303 arrives from the second target base station 103 and is received by the base station 101. The message 303 may correspond for example to a user equipment context release, or it may indicate that the user equipment has accessed the second target base station 103.

After reception of the message 303 from the second target base station 103, a forwarding request 304 is transmitted to the first target base station 102, that commands the first target base station 102 to forward all the data received from the base station 101 to the second target base station 103. The command transmitted by the base station 101 also includes the command to transfer the already received data 305 from the base station 101. Then, the first target base station 102 starts forwarding 306 the already received and the new data to the second target base station 103.

Figure 4:
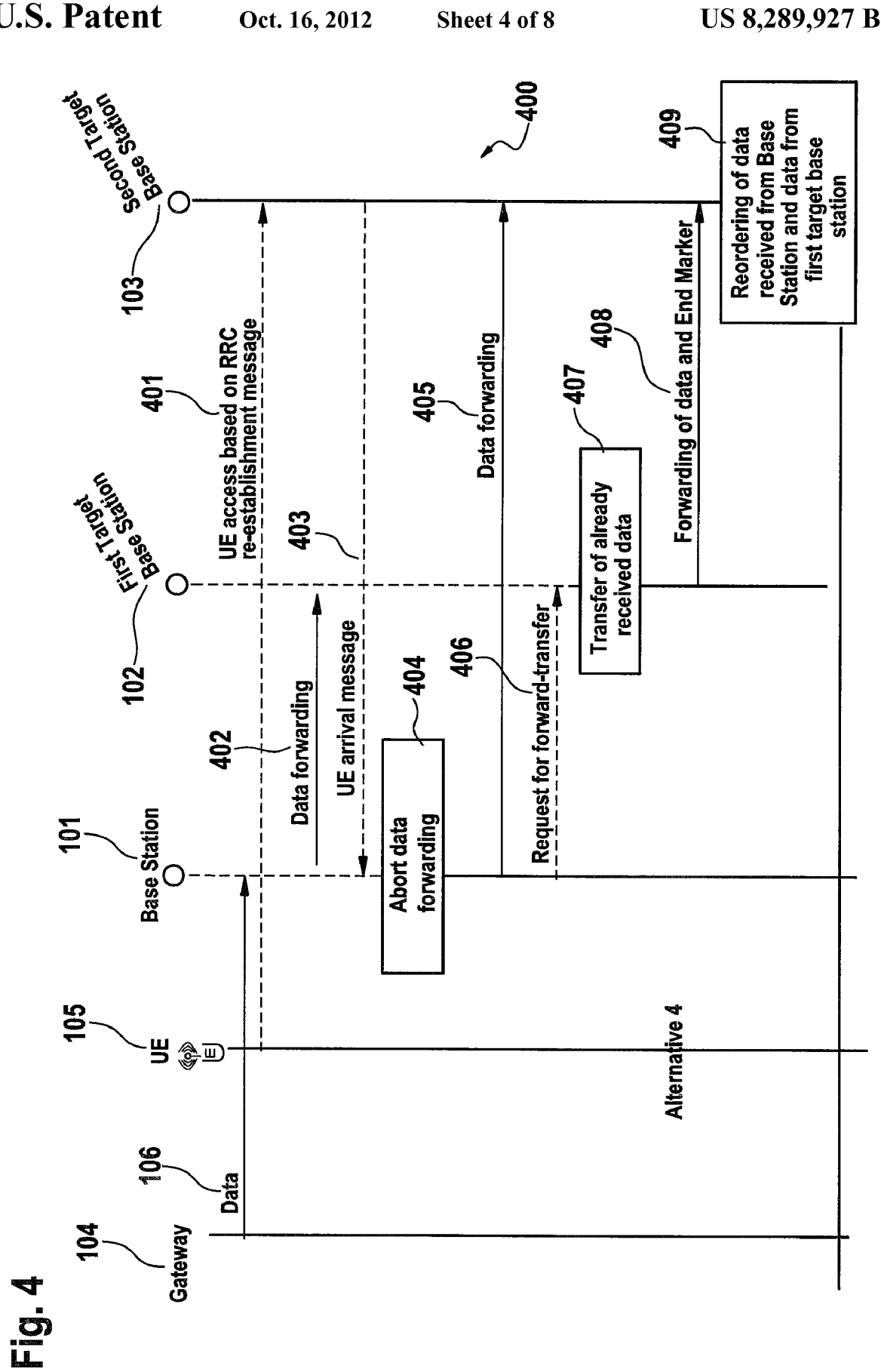
FIG. 4 is a diagram of another embodiment of the data forwarding method.

FIG. 4 shows a diagram 400 of a further embodiment of the data forwarding method in a mobile communication system. During a communication between the base station 101 and the user equipment 105, uplink data is received from the user equipment 105 and downlink data 106 is transmitted from the gateway 104 to the base station 101. If a first handover fails with the selected first target base station 102, the user equipment 105 may request for an access 401 to a second target base station 103, which may have been previously prepared for handover by the base station 101. Until the base station 101 is informed of the radio link or handover failure, the base station 101 forwards the data 402 received from both the gateway and the user equipment to the selected first target base station 102.

After the second target base station 103 accepts the access of the user equipment 105, the second target base station 103 transmits a message 403 to the base station 101, indicating the arrival of the user equipment and the access to the second target base station. The message 403 may be for example a user equipment context release message, or any message that directly or indirectly indicates the access of the user equipment 105 to the second target base station 103. After reception of the message by the base station 101, the base station 101 aborts data forwarding 404 to the first target base station 102 and starts forwarding the data 405 to the second target base station 103. At the same time, the base station 101 sends a request command 406 to the first target base station 102 and requests for a forward transfer of the already received data 407 by the first target base station 102, so that the first target base station 102 forwards the data 408 to the second target base station 103.

Therefore, the second target base station 103 starts receiving data from both the base station 101 and from the first target base station 102. The data received by the second target base station will correspond to data forwarded from the first target base station 102 that has been already forwarded from the base station 101, and also corresponds to data forwarded by the base station 101 that was received by the base station 101 directly from the gateway and/or the user equipment 104. As a consequence, the second target base station 103 may require to reorder 409 the data 405 received from the base station and the data 408 received from the first target base station 102. Further, an end marker message may be transmitted at the end of the data forwarding, indicating that all data has been transmitted from said first target base station 102 to said second target base station 103.

Figure 5:
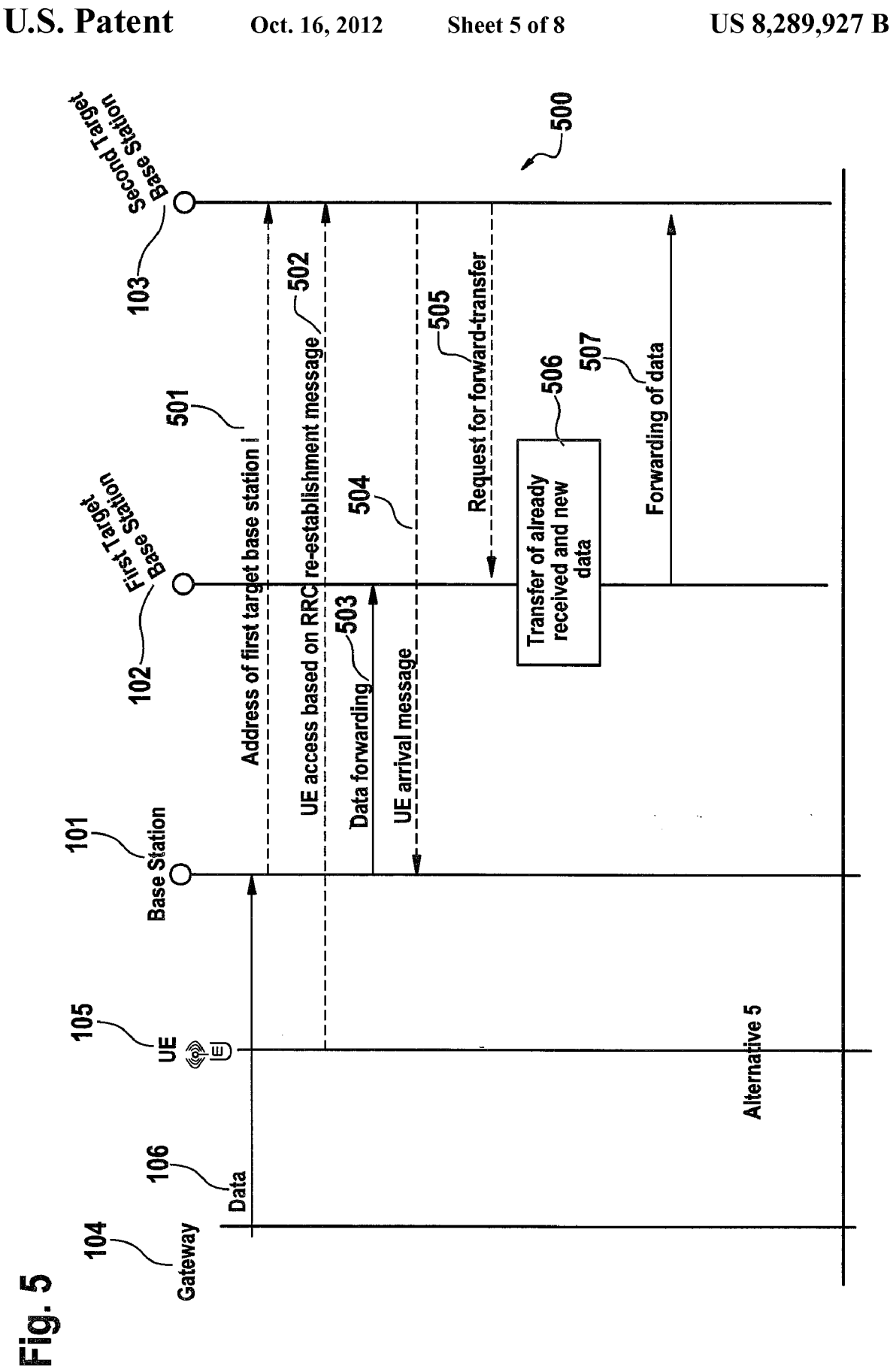
FIG. 5 shows a further embodiment of the data forwarding method of the invention.

FIG. 5 shows a diagram 500 of a further embodiment of a data forwarding method in a mobile communication system. During a typical communication between the user equipment 105 and the base station 101, data 106 is received from a gateway 104 coupled to the base station and to the user equipment 105. If the user equipment 105 requires a handover, the base station may initiate a multiple handover preparation to a set of candidate base stations, and the base station 101 selects a first target base station 102 for the handover. In this context and after selecting the first target base station 102, the base station 101 may transmit an address 501 of the first target base station 102 to at least a second base station 103. The address may be included, for example, in a handover preparation message.

If the user equipment 105 is not able to access the first target base station 102 due to a radio link or handover failure, the user equipment 105 requires to request an access 502 to the second base station 103, for example on a RRC re-establishment message. During the standard handover procedure, the base station 101, after selecting the first target base station 102, starts forwarding 503 the received data from both the gateway 104 and the UE 105 to the first target base station 102.

After the second target base station 103 accepts the access of the user equipment 105, the second target base station 103 transmits a message 504 to the base station 101 indicating the access of the user equipment, for example using a user equipment (UE) context release message. Then, the second target base station 103 further transmits a forwarding-request message 505 to the first target base station 102, for the forwarding of the received data from the base station 101 to the second target base station 103. The first target base station 102 initiates the organization of the transfer 506 of already received data 503 and starts forwarding 507 the data to the second target base station 103. The first target base station 102 continues receiving the data 503 from the base station 101, until the handover procedure has been completed to the secondary base station.

Figure 6:
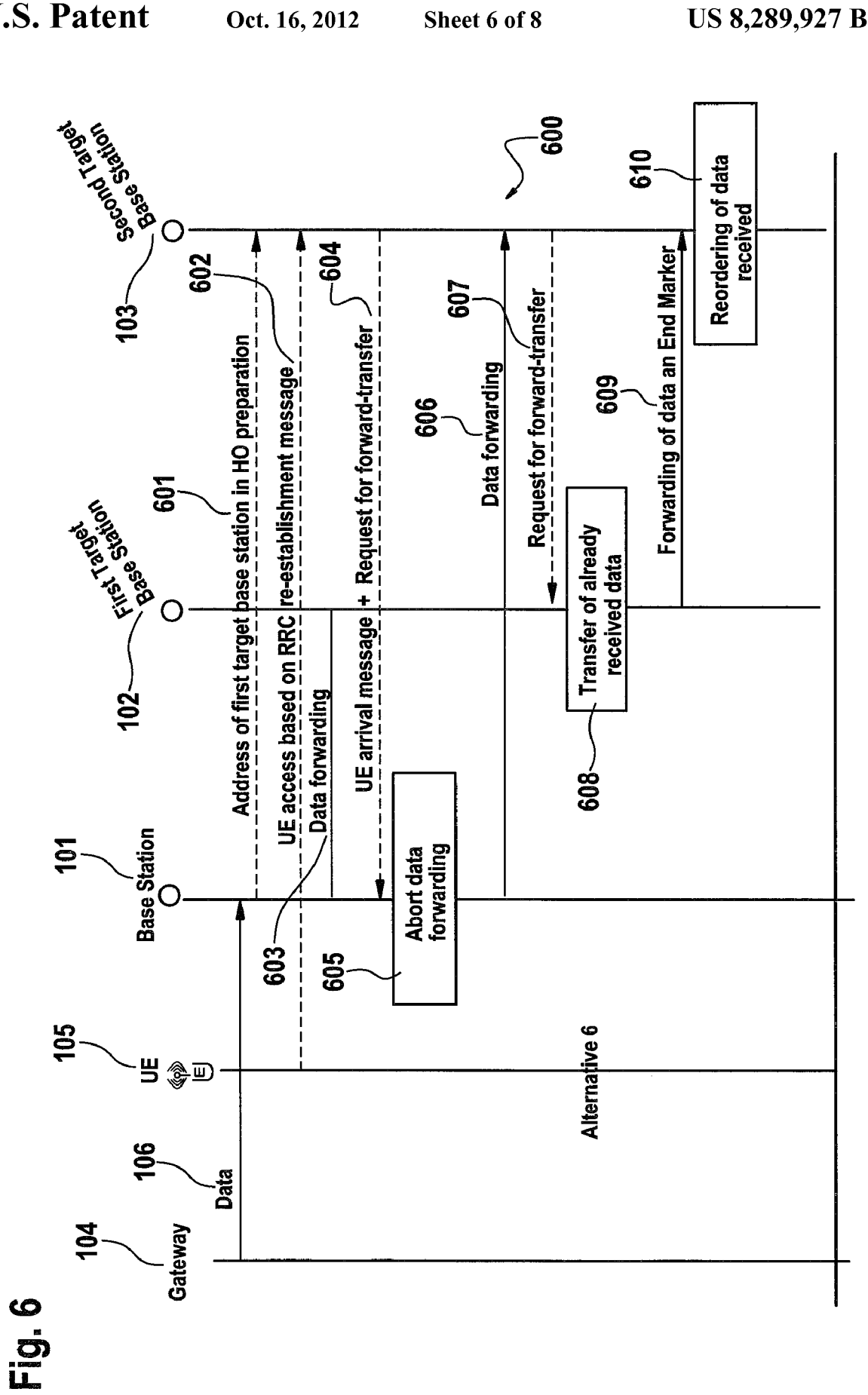
FIG. 6 is a diagram representing a further embodiment of the data forwarding method.

FIG. 6 shows a diagram 600 of a data forwarding method embodiment in a mobile communication system.

The base station 101 receives uplink data from the user equipment 105 and downlink data 106 from the gateway 104. During the multiple handover preparation, and after selecting one of the candidate base stations as a first target base station 102, the base station 101 transmits the address 601 of the first target base station 102 to at least a second base station 103. If the user equipment 105 is not able to access the first target base station 102, due to a radio link or handover failure, the user equipment 105 requests access 602 to second target base station 103, using for example an RRC re-establishment message. The base station 101 after selecting the first target base station 102, it starts forwarding 603 the data received from both the user equipment 105 and the gateway 104 to the first target base station 102.

After the acceptance of the access request from the user equipment 105 by the second target base station 103, the base station 103 transmits a message 604 to the base station 101 being indicative of the access of the user equipment 105 to the second target base station 103. The message 604 also requests the base station 101 for forwarding the received data to the second target base station 103. The base station 101, immediately after receiving the message from the second target base station 103, it aborts 605 forwarding the data to the first target base station 102 and starts forwarding the data 606 to the second target base station.

The second target base station 103 also transmits a forwarding request message 607 to the first target base station 102, commanding to forward the already received data from the base station 101 to the second target base station 103. The first target base station 102 initiates the transfer of already received data 608 and forwards 609 the data to the second target base station 103. Further, an end marker message may be transmitted at the end of the data forwarding, indicating that all data has been transmitted from said first target base station 102 to said second target base station 103. Also, as the second target base station is receiving data from at least two base stations, the second target base station 103 starts the ordering 610 of the data, until the handover procedure has been completed, and the second target base station starts receiving the data directly from the gateway 104 and from the user equipment 105.

There are three basic possible handover failure in radio link failure scenarios. The first scenario, the user equipment detects handover failure and connects not to the selected first target base station, but to another second target base station. In a second scenario, the user equipment detects radio link failure during the handover phase in the base station, it connects not to the first target base station, but to the second target base station. Finally, in a third scenario the user equipment detects radio link failure not in the handover phase in the base station, but prior to the handover, and connects to the second target base station.

Figure 7:
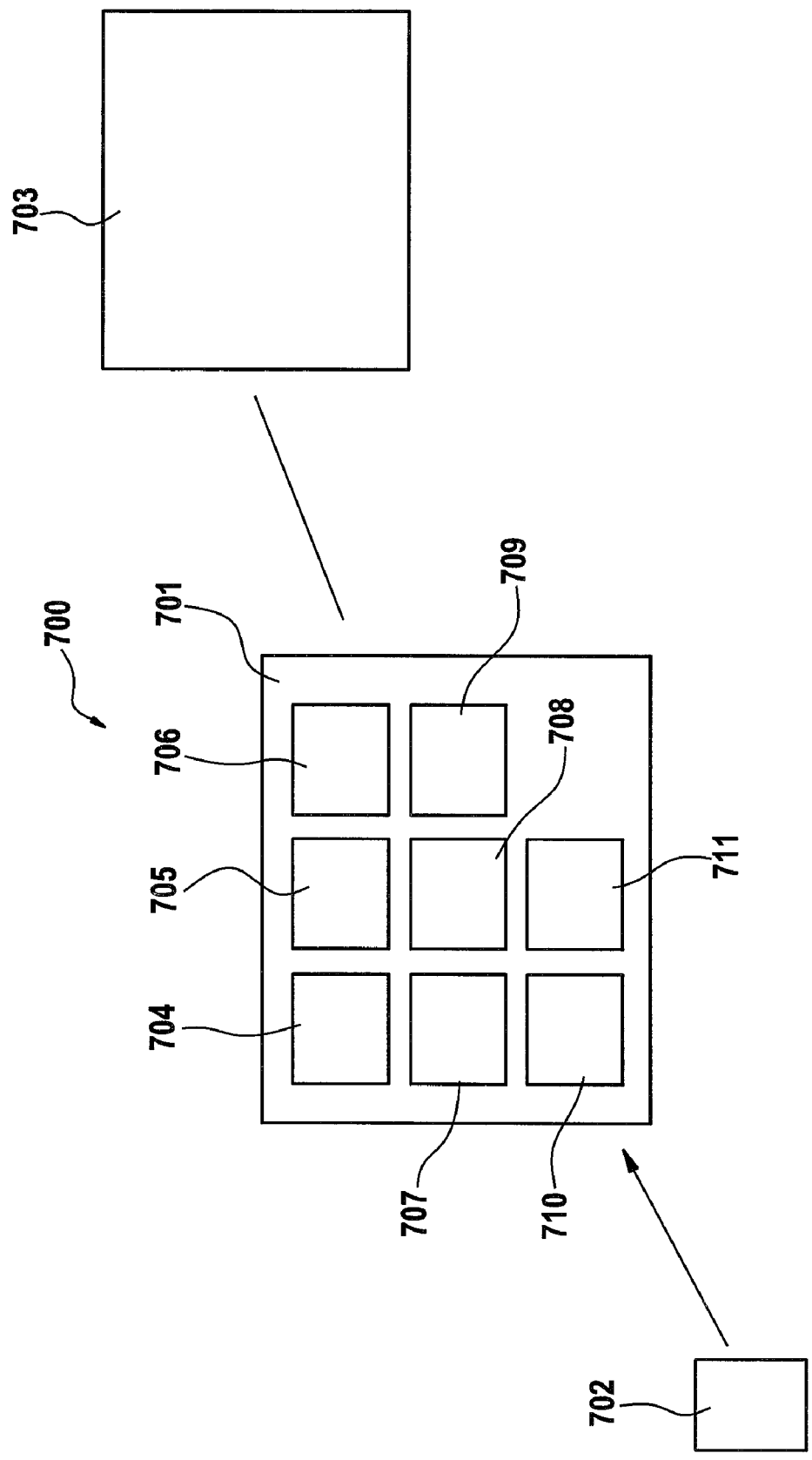
FIG. 7 is a block diagram of an embodiment of a base station in a mobile communication system.

FIG. 7 shows a block diagram illustrating a mobile communication system 700. The mobile communication system 700 comprises a base station 701 coupled to a user equipment 702 and also coupled to the target base station 703. The base station 701 comprises:

A module 704 for selecting said set of base station as candidate base stations for a handover of said user equipment by said base station;

a module 705 for selecting a first target base station for handover from said set of base stations by said base station;

a module 706 for obtaining downlink data from a gateway and uplink data from a user equipment by said base station;

a module 707 for forwarding said uplink and downlink data from said base station to said first target base station.

a module 708 for receiving a message from said second target base station by said base station, said message being indicative of access of said user equipment to a second target base station;

a module 709 for storing said uplink and downlink data in storage means by said base station;

a module 710 for aborting data forwarding to said first target base station by said base station;

a module 711 for forwarding said stored data to said second target base station by said base station.

Figure 8:
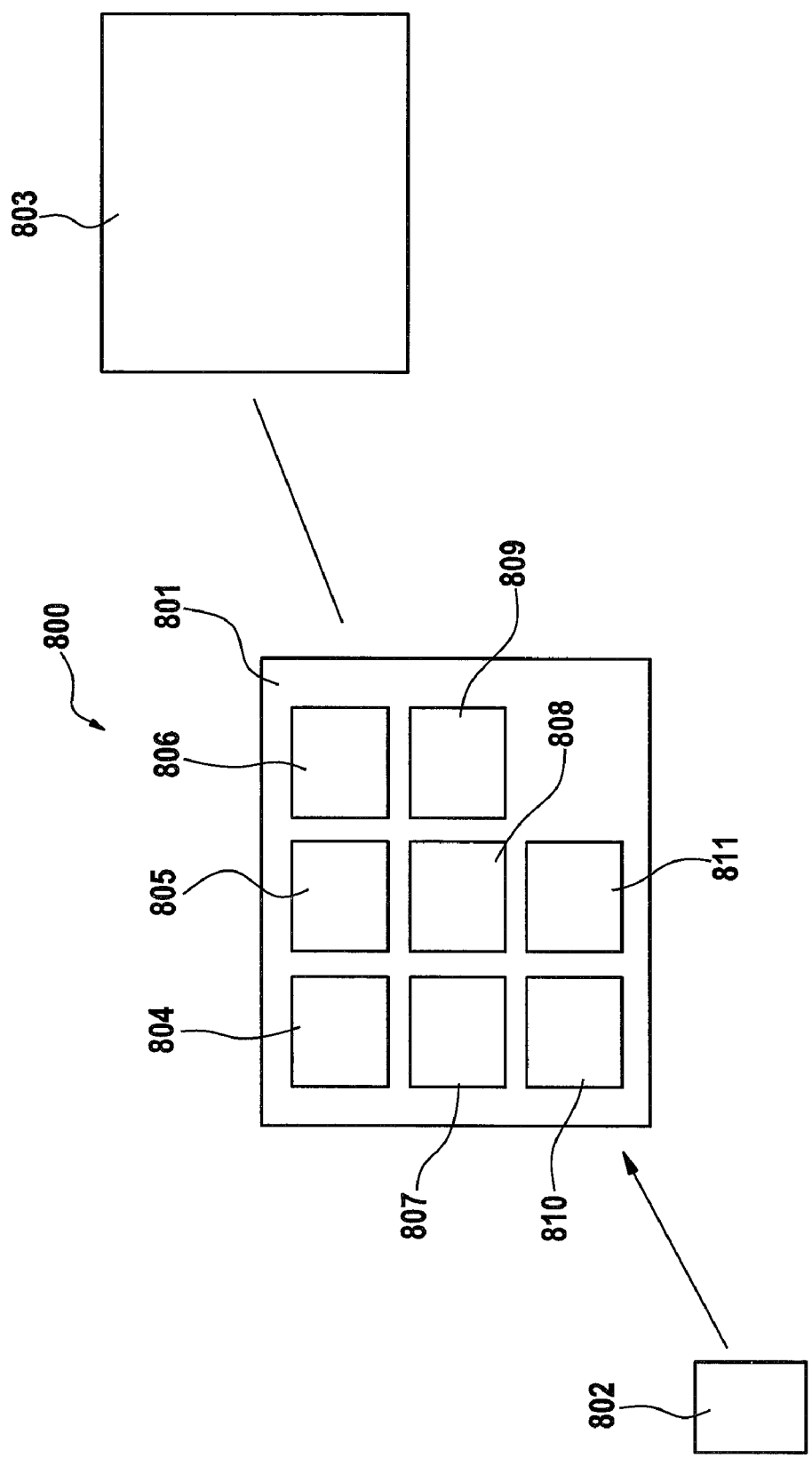
FIG. 8 is a block diagram of a further embodiment of a base station in a mobile communication system.

FIG. 8 shows a block diagram 800 illustrating a mobile communication system comprising a base station 801 coupled to a user equipment 802 and to a target base station 803. The base station 801 comprises:

A module 804 for accepting access request of said user equipment by said second target base station;

a module 805 for transmitting a message by said second target base station to said base station, said message being indicative of access of said user equipment to said second target base station;

a module 806 for requesting data from said first target base station by said second target base station;

a module 807 for receiving said data from said first target base station by said second target base station.

a module 808 for receiving said data from said base station by said second target base station;

a module 809 for obtaining an end marker message indicating that all data has been transmitted from said first target base station by said second base station;

a module 810 for reordering said data received from said base station and from said first target base station by said second target base station;

a computer program module 811 comprising executable program means for causing the base station 801 to perform a method according to any of the preceding embodiments.

LIST OF REFERENCE NUMERALS

| | |
|---|---|
| 100 | Diagram |
| 101 | Base station |
| 102 | First target base station |
| 103 | Second target base station |
| 104 | Gateway |
| 105 | User equipment |
| 106 | Data |
| 107 | Re-establishment message |
| 108 | Keep copy of forwarded data |
| 109 | Data forwarding |
| 110 | Message |
| 111 | Aborting data |
| 112 | Handover cancel |
| 113 | Forwarding of copied data |
| 200 | Diagram |
| 201 | Re-establishment message |
| 202 | Data forwarding |
| 203 | Arrival message |
| 204 | Aborting data |
| 205 | Request for forward transfer |
| 206 | Data backward |
| 207 | Reordering of data |
| 208 | Forwarding of backward data |
| 300 | Diagram |
| 301 | Re-establishment message |
| 302 | Data forwarding |
| 303 | Arrival message |
| 304 | Request for forward transfer |
| 305 | Transfer of data |
| 306 | Forwarding data |
| 400 | Diagram |
| 401 | Re-establishment message |
| 402 | Data forwarding |
| 403 | Arrival message |
| 404 | Aborted data |
| 405 | Data forwarding |
| 406 | Request for forward transfer |
| 407 | Transfer of already received data |
| 408 | Forwarding data |
| 409 | Reordering of data |
| 500 | Diagram |
| 501 | Address of first target base station |
| 502 | Re-establishment message |
| 503 | Data forwarding |
| 504 | Arrival message |
| 505 | Request for forward transfer |
| 506 | Transfer of data |
| 507 | Forwarding data |
| 601 | Address of first target base station |
| 602 | Re-establishment message |
| 603 | Data forwarding |
| 604 | Arrival message |
| 605 | Abort data |
| 606 | Data forwarding |
| 607 | Request for forward transfer |
| 608 | Transfer of received data |
| 609 | Forwarding of data |
| 610 | Reordering of data |
| 700 | Mobile communication system |
| 701 | Base station |
| 702 | User equipment |
| 703 | Target base station |
| 704-711 | Modules |
| 800 | Mobile communication system |
| 801 | Base station |
| 802 | User equipment |
| 803 | Target base station |
| 804-811 | modules |

The invention claimed is:

1. A method of data forwarding during handover in a mobile communication system, the method comprising:

selecting first and second base stations from a plurality of other base stations as candidate base stations for a handover of a user equipment by a source base station, the source base station and the plurality of other base stations forming a mobile communication system and coupled to a gateway, wherein a telecommunication link is established between the user equipment and the gateway through the source base station;

selecting the first target base station from said candidate base stations for an attempted handover of the user equipment by said source base station;

obtaining downlink data from the gateway and uplink data from the user equipment by said source base station;

forwarding said uplink and downlink data from said source base station to said first target base station;

receiving an arrival message from the second target base station of the candidate base stations indicative of access of the user equipment to the second target base station after the second target base station accepted an access request from the user equipment in response to receiving a connection establishment message from the user equipment after the user equipment detected a handover failure or a radio link failure in conjunction with the attempted handover to the first target base station; and forwarding said uplink and downlink data to said second target base station.

2. The method of claim 1, wherein the method further comprises:

storing said uplink and downlink data in storage means by said source base station; and aborting data forwarding to said first target base station by said source base station;

wherein said forwarding to said second target base station further comprises:

forwarding said stored uplink and downlink data to said second target base station by said source base station.

3. The method of claim 1 further comprising:

aborting data forwarding to said first target base station by said source base station;

requesting said uplink and downlink data from said first target base station by said source base station; and obtaining said uplink and downlink data from said first target base station by said source base station;

wherein said forwarding to said second target base station step further comprises:

forwarding said obtained uplink and downlink data to said second target base station by said source base station.

4. The method of claim 3 further comprising:
obtaining by said source base station an end marker message indicating that all uplink and downlink data has been transmitted from said first target base station to the source base station; and
reordering said uplink and downlink data obtained from said first target base station and from said gateway by said source base station before forwarding to said second target base station.

5. The method of claim 1 further comprising:
transmitting a forwarding-request from the source base station to said first target base station for forwarding of said uplink and downlink data from the first target base station to said second target base station
wherein said forwarding to said second target base station further comprises:
forwarding said uplink and downlink data from the first target base station to said second target base station; and
forwarding said uplink and downlink data to said first target base station by said source base station.

6. The method of claim 1 further comprising:
aborting data forwarding to said first target base station by said source base station; and
transmitting a forwarding-request from the source base station to said first target base station for forwarding of said uplink and downlink data from the first target base station to said second target base station;
wherein said forwarding to said second target base station further comprises:
forwarding said uplink and downlink data from the first target base station to said second target base station; and
forwarding said uplink and downlink data to said second target base station by said source base station.

7. The method of claim 1 further comprising:
requesting said uplink and downlink data from said first target base station by said second target base station; and
receiving said uplink and downlink data from said first target base station by said second target base station.

8. The method of claim 1 further comprising:
aborting data forwarding to said first target base station by said source base station;
requesting said uplink and downlink data from said first target base station by said second target base station;
requesting said uplink and downlink data from said source base station by said second target base station; and
receiving said uplink and downlink data from said first target base station and from said source base station by said second target base station.

9. The method of claim 6 further comprising:
obtaining an end marker message from the first target base station at the second target base station indicating that all uplink and downlink data has been transmitted from said first target base station to said second target base station; and
reordering said uplink and downlink data received from said source base station and from said first target base station by said second target base station.

10. The method of claim 7, wherein a first target base station identification is transmitted by said source base station to said second target base station.

11. The method of claim 8, further comprising:

obtaining an end marker message from the first target base station at the second target base station indicating that all uplink and downlink data to be transmitted from the first target base station to the second target base station has been transmitted; and
reordering the uplink and downlink data received from the source base station and from the first target base station at the second target base station.

12. The method of claim 8 wherein a first target base station identification is transmitted by the source base station to the second target base station.

13. A source base station for a mobile communication system, the source base station comprising:
a processor for selecting first and second base stations from a plurality of other base stations as candidate base stations for a handover of a user equipment;
the source base station and the plurality of other base stations forming a mobile communication system and coupled to a gateway, wherein a telecommunication link is established between the user equipment and the gateway through the source base station, the processor also for selecting the first target base station from said candidate base stations for an attempted handover of the user equipment;
a first receiver for obtaining downlink data from the gateway;
a second receiver for obtaining uplink data from the user equipment;
a transmitter for forwarding said uplink and downlink data to said first target base station;
a third receiver for receiving an arrival message from said second target base station of the candidate base stations, said arrival message being indicative of access of said user equipment to the second target base station after the second target base station accepted an access request from the user equipment in response receiving a connection establishment message from the user equipment after the user equipment detected a handover failure or radio link failure in conjunction with the attempted handover to the first target base station; and
a non-transitory computer readable medium for storing said uplink and downlink data;
wherein the processor and transmitter are configured for aborting data forwarding to said first target base station by said base station
and for forwarding said stored uplink and downlink data to said second target base station after receiving the arrival message.

14. A mobile communication system, comprising:
a source base station coupled to a gateway; and
a plurality of other base stations coupled to the gateway;
wherein, when a telecommunication link is established between the user equipment and the gateway through the source base station, the source base station is operable to:
select first and second base stations from the plurality of other base stations as candidate base stations for a handover;
select the first target base station from the candidate base stations for an attempted handover of the user equipment by the source base station;
obtain downlink data from the gateway and uplink data from the user equipment by the source base station;
forward the uplink and downlink data from the source base station to the first target base station;
receive an arrival message from the second target base station of the candidate base stations indicative of access of the user equipment to the second target base station after the second target base station accepted an access request from the user equipment in response to receiving a connection establishment message from the user equipment after the user equipment detected a handover failure or a radio link failure in conjunction with the attempted handover to the first target base station; and forward the uplink and downlink data to the second target base station.

15. A non-transitory computer-readable medium storing a computer program product that, when executed by a processor, causes a corresponding processor-controlled source base station to perform a method of data forwarding during handover in a mobile communication system, method comprising:

selecting first and second base stations from a plurality of other base stations as candidate base stations for a handover of a user equipment by a source base station, the source base station and the plurality of other base stations forming a mobile communication system and coupled to a gateway, wherein a telecommunication link is established between the user equipment and the gateway through the source base station;

selecting the first target base station from said candidate base stations for an attempted handover of the user equipment by said source base station;

obtaining downlink data from the gateway and uplink data from the user equipment by said source base station;

forwarding said uplink and downlink data from said source base station to said first target base station;

receiving an arrival message from the second target base station of the candidate base stations indicative of access of the user equipment to the second target base station after the second target base station accepted an access request from the user equipment in response to receiving a connection establishment message from the user equipment after the user equipment detected a handover failure or a radio link failure in conjunction with the attempted handover to the first target base station; and forwarding said uplink and downlink data to said second target base station.

16. A second target base station for a mobile communication system, the second target base station comprising:

a first receiver for receiving an access request from a user equipment after the user equipment detected a handover failure or radio link failure in conjunction with an attempted handover from a source base station to a first target base station, the source base station, first target base station, and second target base station forming a mobile communication system and coupled to a gateway, wherein a telecommunication link is established between the user equipment and the gateway through the source base station;

a processor for accepting the access request of said user equipment;

a first transmitter for transmitting an arrival message to said source base station, said arrival message being indicative of access of said user equipment to said second target base station;

a second transmitter for requesting uplink and downlink data from said first target base station in conjunction with the attempted handover from the source base station to said first target base station, wherein the uplink data was received by the source base station from the user equipment, the downlink data was received by the source base station from the gateway, and the uplink and downlink data was forwarded from the source base station to the first target base station in conjunction with the attempted handover; and a second receiver for receiving said uplink and downlink data from said first target base station.

17. The second target base station of claim 16 wherein the source base station aborts forwarding the uplink and downlink data to the first target base station after receiving the arrival message, wherein the first transmitter is also for requesting uplink and downlink data from the source base station in conjunction with transmitting the arrival message, the second target base station further comprising:

a third receiver for receiving said uplink and downlink data from said source base station.

18. The second target base station of claim 16 wherein the first target base station identification is transmitted by the source base station to the second target base station.

19. The second target base station of claim 17 wherein the second receiver is also for obtaining an end marker message indicating that all uplink and downlink data to be transmitted from said first target base station to said second base station has been transmitted, wherein the processor is also for reordering said uplink and downlink data received from said source base station and from said first target base station.

20. The second target base station of claim 17 wherein the first target base station identification is transmitted by the source base station to the second target base station.

* * * * *